April 22, 1969 R. R. SHARETTS 3,440,078
HOLDING AND MASKING DEVICE
Original Filed May 25, 1962

INVENTOR
ROBERT R. SHARETTS

ATTORNEYS

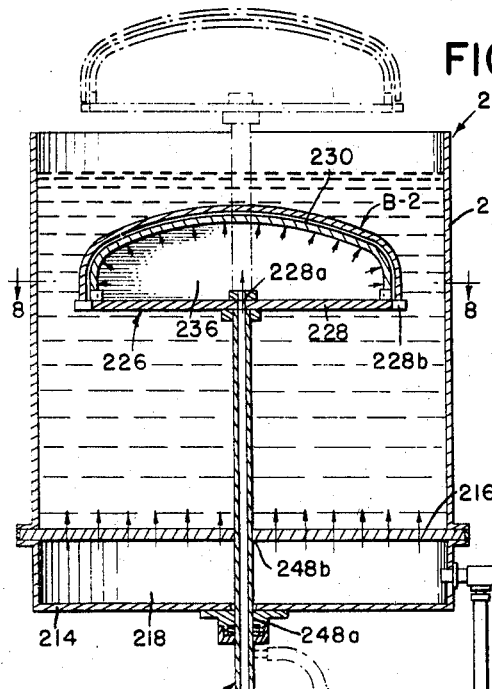
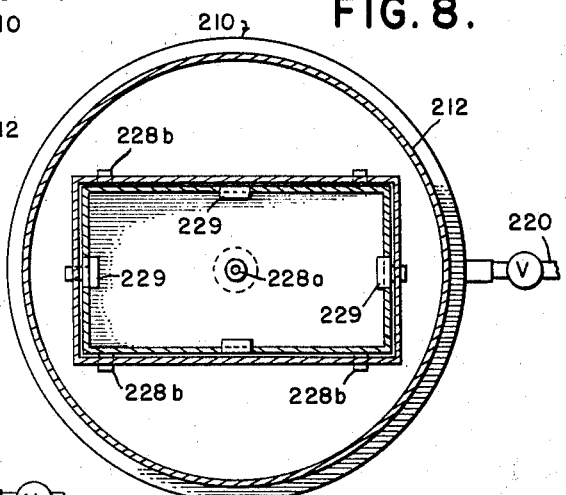
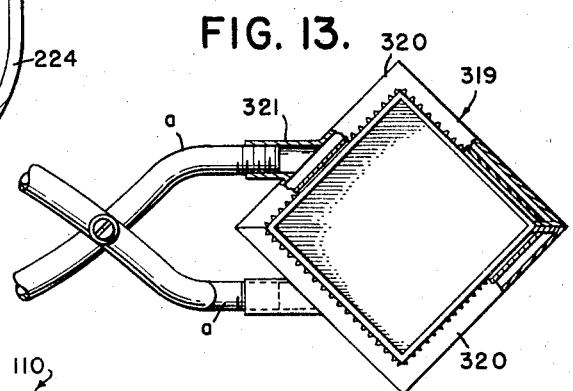
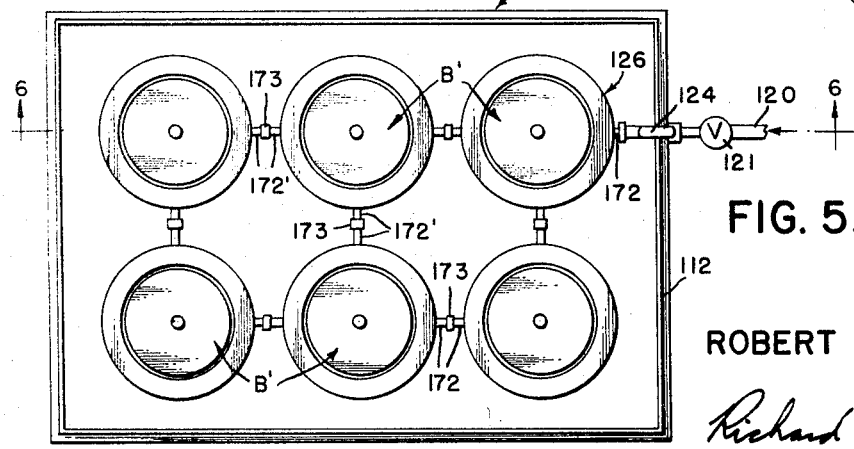
INVENTOR
ROBERT R. SHARETTS

April 22, 1969 R. R. SHARETTS 3,440,078
HOLDING AND MASKING DEVICE
Original Filed May 25, 1962 Sheet 3 of 3
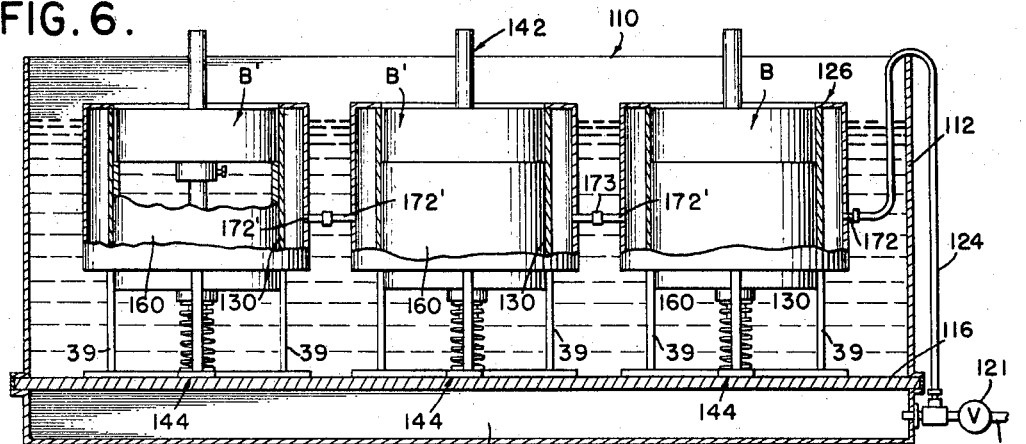
FIG. 6.
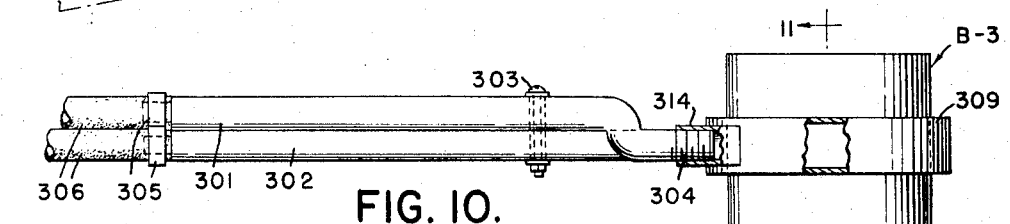
FIG. 9.
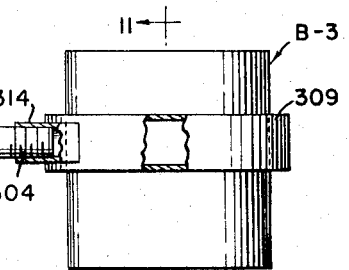
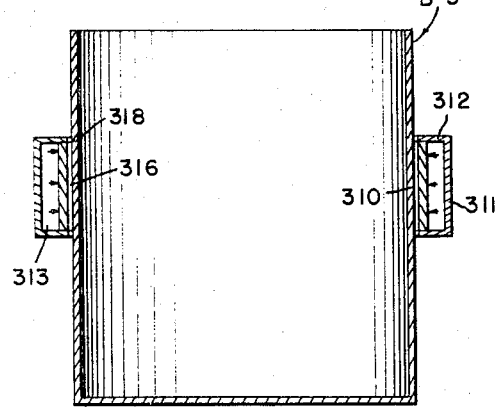
FIG. 10.
FIG. 11.
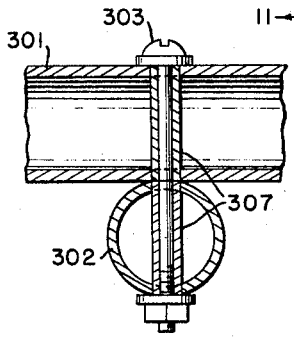
FIG. 12.
INVENTOR
ROBERT R. SHARETTS
BY
ATTORNEYS United States Patent Office 3,440,078
Patented Apr. 22, 1969

3,440,078
HOLDING AND MASKING DEVICE
Robert R. Sharetts, Reading, Pa., assignor, by mesne assignments, to The Polymer Corporation, a corporation of Pennsylvania
Continuation of application Ser. No. 197,654, May 25, 1962. This application Mar. 16, 1966, Ser. No. 534,916
Int. Cl. B44d 1/095, 1/52
U.S. Cl. 117—21                                             12 Claims

ABSTRACT OF THE DISCLOSURE

Articles to be coated in heat fusion processes are masked and held by a device that impinges a moving stream of air against that portion of the article to be masked.

---

This application is a continuation of copending application Ser. No. 197,654, filed May 25, 1962, now abandoned.

This invention relates to the art of coating and more particularly to coating articles by fusion coating processes. This invention is especially directed to improved methods and means for masking and holding articles while such articles are coated in fusion coating processes.

As used herein, fusion coating processes refer to those processes wherein articles are contacted with pulverulent, free-flowing, heat-fusible coating materials. When the coating materials are in contact with the article, they are sufficiently heated to cause them to fuse into a smooth continuous layer over the surface of the article.

Examples of such fusion coating processes are flame spraying, powder blowing, electrostatic spraying, fluidized bed, tumbling, dust chambers and other powder coating systems. In the illustration and accompanying description of the present invention the invention is described particularly with respect to coating by the fluidized bed process, but it is to be understood that this is by way of illustration and is not intended to limit the method to this specific fusion coating process.

As examples of suitable coating materials for fusion coating, synthetic resins may be mentioned, although other heat-fusible substances, such as metals, glass, and ceramics, sometimes may advantageously be used.

In fusion coating processes, it is generally necessary to provide means for holding an article to be coated while it is brought in contact with the finely divided coating materials. Further, it is often desired to prevent a portion of the article from being coated by the coating materials. When both of these conditions pertain, it is of considerable utility to design a device that will both hold the article to be coated and, at the same time, mask those areas on which a coating is not desired. For convenience, devices of this type are referred to as holding and masking devices.

Holding and masking devices may become heated during the coating operation due to the conduction of heat from the heated article to be coated and/or by being attached to the article while such article is raised to the fusion temperature of the coating materials. As a result, the holding and masking device itself often approaches or exceeds the fusion temperature of the coating materials and, as a result, a layer of coating materials soon builds up on such devices. For efficient utilization of these holding and masking devices, it is important that this pickup of coating materials be avoided.

Devices are known in the prior art which avoid this powder pickup by, for example, cooling the holding and masking devices by liquid coolant circulation, fabricating the devices from materials that minimize powder pickup or adherence (e.g., polytetrafluoroethylene), utilizing devices that have either high or low heat capacity, the former being used to delay the length of time in which the device heats up and the latter being used in order that heat may rapidly be dissipated.

Holding and masking devices in the prior art also have been disadvantageous since, at the point of contact between the device and the article to be coated, a ledge or shelf may be present that accumulates excessive amounts of powder thereon. As a result, excessively thick or irregular coatings sometimes formed on the article at the point of contact with the holding and masking device.

Accordingly, it is an object of the present invention to provide a new holding and masking device for coating articles in fusion coating processes whereby the device will not become coated by the coating materials.

Another object of this invention is to provide a new method and apparatus for supporting an article at a masked portion thereof while effecting the coating of the unmasked portion by fusion coating processes.

Another object of this invention is to provide a novel means for effecting the coating of a portion of a body by fusion coating processes while maintaining other portions of said body free of such coating without the necessity of applying any type of device to the body or otherwise performing any physical operation thereon to accomplish the desired masking.

Still another object of this invention is to provide improved holding and masking devices whereby objects can be coated in fusion coating processes without developing unequal coatings at the point of contact between the devices and the articles.

The invention broadly comprises the provision of apparatus by means of which a masking film of air is maintained, in an active state, over the surface or area of the body which is to remain uncoated, while the body is introduced in the required heated condition into the fluidized bed or otherwise has the fusible coating material brought into contact therewith. The means of accomplishing this result comprises, in one instance, the enclosing of the area to be masked, by a casing, box or chamber having a porous, or air pervious wall, facing or covering the area which is to remain uncoated. This casing or box has air or other suitable gas introduced thereinto under pressure and in passing through the pervious wall, the velocity of the air over the surface of the object prevents any of the pulverulent fusible material from coming into contact with the heated surface of the object or body.

The air box or casing may be in the form of a structure supported within a receptacle in which the pulverulent material is contained and which receptacle may be provided with an air pervious bottom wall covering a compressed air manifold or the air box may constitute a part of the wall of the container or receptacle for the pulverulent material. In association with such structure, means is provided for introducing into the fluidized bed, the body to be coated, and for positioning the body with the area to be masked closely adjacent to the surface of the porous wall so that the masking air or gas passing through the wall will blanket the adjacent area of the body.

Means is also provided in the apparatus whereby all or a portion of the interior of a hollow body may be effectively masked by a blanket of air or gas while such body is introduced into the fluidized bed whereby the exterior only of the body will be coated.

The present inventive concept is also embodied in a hand tool in the form of tongs in which jaws form the air box or casing in which and by which a body may be held with the wall portion of the box or casing facing the body being porous for the discharge of air therethrough against the surface of the body and means being provided for introducing air under pressure into the box, or the sections thereof, whereby there is not only obtained the desired masking effect but the masking air or gas may be utilized in a chilled or low temperature condition to minimize the absorption by the parts of the air box or casing, of heat from the heated body to be coated and to accordingly prevent or reduce to a minimum the coating of the air box.

Other objects and advantages of the invention will become apparent as the description of the same proceeds and the invention will be best understood from a consideration of the following detailed description taken in connection with the accompanying drawings, wherein:

FIG. 5 is a view in top plan of a modified arrangement whereby a multiplicity of units, such as the one illustrated in FIG. 1, may be joined together in a battery for multiple operation of the process.

FIG. 6 is a view in vertical section taken substantially on the line 6—6 of FIG. 5 and showing the air casings partly in side elevation and partly in vertical section.

FIG. 7 illustrates in vertical section another embodiment of the invention whereby the air masking method is employed for masking the interior surface of a hollow body.

FIG. 8 is a horizontal section taken substantially on the line 8—8 of FIG. 7.

FIG. 9 is a view illustrating partly in section and partly in elevation a hand manipulating means in the nature of tongs for carrying out the masking operation upon a small object.

FIG. 10 is a view in side elevation of the structure shown in FIG. 9, with portions of the structure broken away.

FIG. 11 is a sectional view on an enlarged scale taken substantially on the line 11—11 of FIG. 10.

FIG. 12 is a detailed section taken substantially on the line 12—12 of FIG. 9.

FIG. 13 is a view partly in section of another embodiment of the device shown in FIG. 9.

Figure 1:
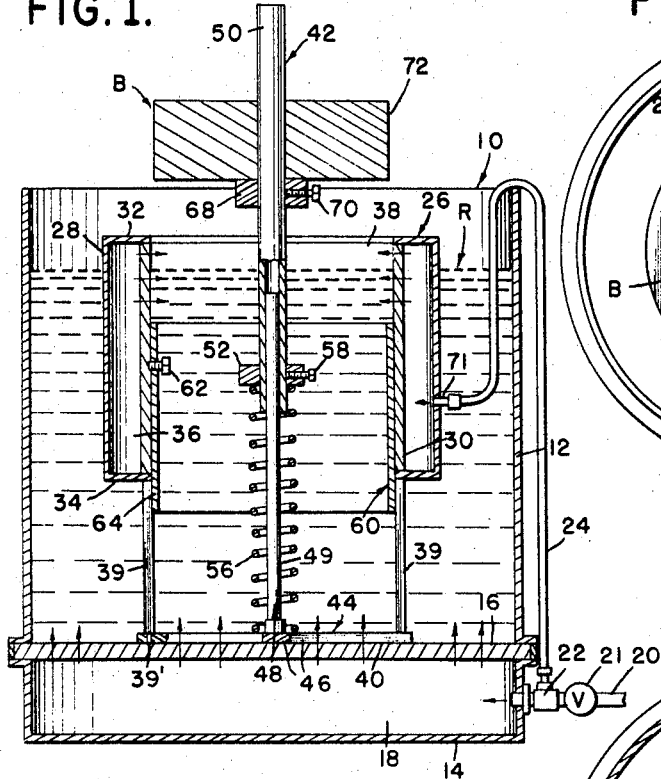
FIG. 1 is a vertical sectional view taken through apparatus constructed in accordance with one embodiment of the present invention for carrying out the air masking operation and showing in this figure an object of circular form mounted upon a carrier or support preparatory to its introduction into the apparatus.

Referring now more particularly to the drawings, the description of apparatus for carrying out the present method of masking will be directed first to the form of the structure illustrated in FIGS. 1 to 4.

In this first embodiment of the apparatus, the numeral 10 generally designates a container or receptacle of the desired capacity in which the pulverulent, thermoplastic resin is contained to be fluidized in the manner about to be described and which is in accordance with the fluidized bed coating process.

The receptacle or container is here shown as being cylindrical in form, although it may be of any desired configuration, and comprises an upper section 12 and a lower section 14, which upper and lower sections 12 and 14 are divided or separated from one another by an interposed horizontal wall 16 which is pervious to the gas used for fluidizing the pulverulent coating material, but which is impervious to the particles of coating material. This partitioning wall 16 between the upper and lower chamber-forming sections of the apparatus is preferably in the form of a porous ceramic plate, although other similar plate structure composed of an Alundum refractory material or structures may be advantageously used as, for example, a terial composed of fused alumina grains bonded together with an aluminous glass at a high firing temperature.

The lower section 14 of the apparatus forms an air chamber 18 into which air or other suitable gas is introduced through the pipeline 20, in which pipeline is located a suitable control valve 21 whereby the pressure of the gas may be regulated as desired.

The pipeline 20 has connected therein between the valve 21 and the wall of the section 14, a T-coupling 22 with the lateral arm of which is connected one end of a feed pipe 24, the other end of which pipe is connected in the manner hereinafter described, with the gas box or casing which is generally designated 26. An air control valve (not shown) may advantageously be associated with feed pipe 24 separately to control the gas flow therein.

No details of the construction of the receptacle as regards the parts 12, 14 and 16 are here given, as this construction is fully illustrated and described in the patent to Gemmer, 2,844,489.

The gas box, or casing 26 is a hollow wall structure, as shown, and is here illustrated as being cylindrical in form. However, obviously, the cylindrical form of the box is not essential to the working of the invention, as the box may be of any desired or suitable cross sectional configuration.

The structure 26 embodies the outer wall 28, the inner wall 30 and the top and bottom walls 32 and 34, respectively, connecting the inner and outer walls and thereby forming the gas chamber or compartment 36.

As shown, the gas box or casing has an open top 38 end and an open bottom end 40.

The inner wall 30 of the gas box or casing is formed of a suitable porous or air pervious material, which material may be the same as that of the horizontal partitioning wall 16.

The gas box or casing is preferably supported at a substantial elevation above the porous partitioning wall 16, by a suitable means, with the open top 38 disposed to be above the maximum level of the bed of pulverulent coating material when the latter is in a fluidized condition. While any suitable means, as stated, may be employed for supporting the air box or casing 26, there are here shown leg members 39 connected to the bottom part of the box or casing. These leg members may stand directly upon the partition wall 16 or be supported and/or attached to the hereinafter described spider, so as to be maintained properly centered with respect to the holding means for the body which is to be coated.

Resting upon the top of the wall 16 is a carrier structure which is generally designated 42 and by means of which an object or body to be partially coated and partially masked is supported for lowering into the fluidized bed of material.

The body carrier comprises a base portion in the form of a spider 44, the arms 46 of which rest upon the surface of the partitioning wall and extend outwardly as shown. The lower ends of the legs 39 may be set, if desired, to rest upon the arms of the spider and each may be secured to an arm in a suitable manner, as, for example, by means of a pin 39' extended into the supporting arm. Each leg may, however, stand on the partitioning wall 16 as previously stated, and in such case a suitable means may be employed for securing the leg to the spider arm.

At the center of the spider there is fixed a standard which is generally designated 48 and which comprises a lower end portion 49 and a tubular upper end portion 50 into which the upper end of the lower end of the portion 49 is secured at the center of the spider in a suitable manner, as shown.

The lower end of the tubular portion 50 of the standard or support structure carries a collar 52 which is adjustably secured to the portion 50 and between this collar and the spider 44 is a coiled expansion spring 56 which encircles the lower portion 49 of the body carrier. The spring rests upon the spider as shown and bears at its upper end against collar 52.

Means, here shown as a set screw 58, is provided for securing the collar 52 in any desired adjusted position on the tubular portion 50 of the body carrier.

The gas box 26 has positioned therein a shield unit which is generally designated 60. This shield unit is of the same shape or contour as the interior wall 30 of the gas box and is positioned relatively snugly against such wall and is designed to be adjusted vertically and/or positioned in an adjusted shielding position in a suitable manner as, for example, by a means of a set screw 62 threaded through the wall of the shield and adapted to engage the inner surface of the wall 30 of the box.

The shield 60 is a relatively thin plate of suitable material which is generally designated 64. The shield is, of course, open at the top and bottom so that the fluidized material can rise therein, and by elevating the gas box 26 above the partition wall 16 it will be readily seen that the gas flowing in from the chamber 18 through the wall 16 can readily pass on either side of the gas box and upwardly through the same and through the shield 60.

The vertically movable tubular portion 50 of the body carrier passes through and has fixed thereto a support collar 68. The means here shown for adjustably securing this collar in desired position is a set screw 70 but obviously any suitable means may be provided for this purpose.

As illustrated, the air or gas feed pipe 24 has its other end connected by a nipple, or other suitable means 71 to the wall 28 of the gas box, whereby to introduce the air or gas under pressure into the chamber 36.

As is indicated by the arrows at the top or upper part of the gas box, when the shield unit 60 is set up within the gas box with the top edge thereof at a specified or desired distance below the open top of the gas box, the air or gas from the chamber 36 will escape into the interior of the area circumscribed by the wall 30, only through the uncovered part of the wall 30, or, in other words, through the part thereof which is not covered by the shield unit.

The extent of the uncovered area of the pervious wall 30 is determined by the area to be masked out on the body which is to be dipped into the fluidized bed for coating.

The structure shown in FIGS. 1 to 4 is intended to be used for masking an area of a body having a central passage therethrough which permits it to be placed upon the tubular upper end portion 50 of the body support in the manner illustrated, where the body to be treated is generally designated B. This body is here shown as being of circular form and may represent, for example, the rotor for an electric motor where it is desirable that all of the surfaces be coated with the exception of the peripheral surface, designated 72.

Figure 2:
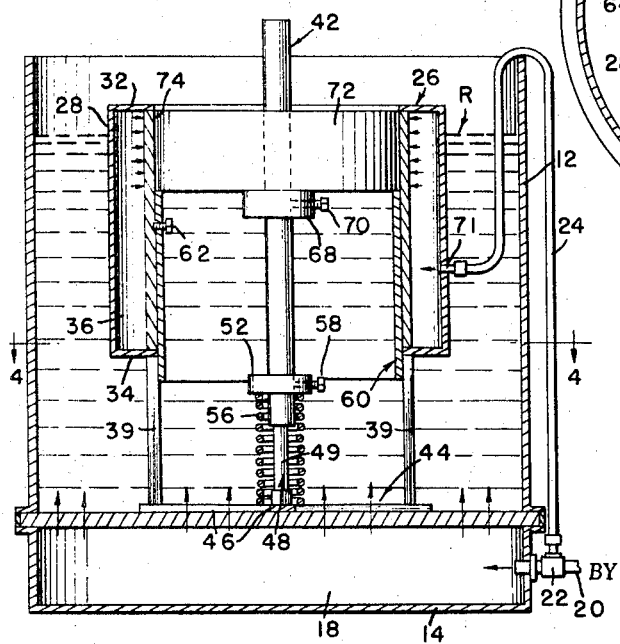
FIG. 2 is a vertical sectional view corresponding to FIG. 1 and showing the body immersed in the fluidized bed.
Figure 3:
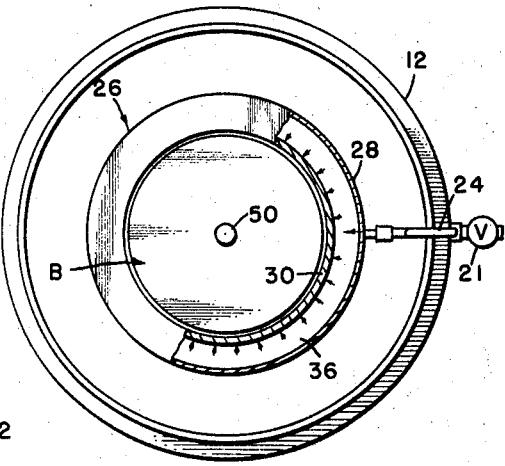
FIG. 3 is a view in top plan of the apparatus as illustrated in FIG. 1, with a portion of the air box or casing in horizontal section.
Figure 4:
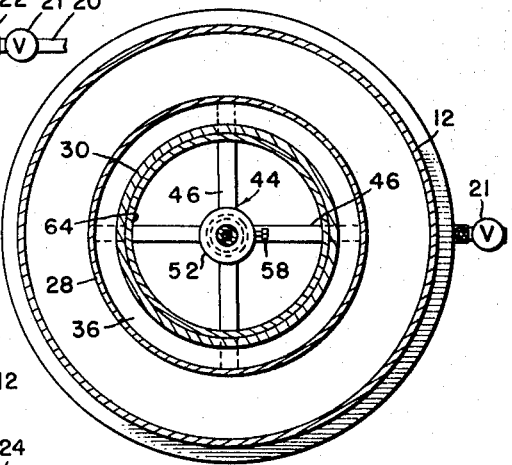
FIG. 4 is a sectional view taken in horizontal plane substantially on the line 4—4 of FIG. 2.

The diameter of the body as compared to the inside diameter of the porous wall 30 may be such that when the body B is centered within the area defined by the porous wall 30, a small clearance will be provided, as indicated at 74 in FIG. 2, into which the masking gas may pass to form a fluid mask around the body over the surface 72.

If the exterior surface 72 of the body B is not particularly smooth then such a slight clearance is not so important since the unsmooth condition of the surface 72 will provide a sufficient clearance to permit the gas to flow upwardly around the body to produce the desired shielding effect.

As hereinbefore stated, the elevation of the top wall 32 of the gas box will be such, with respect to the bed of pulverulent coating material, when the latter is in a fluidized condition, as to lie above the upper surface or upper boundary zone of the fluidized material, and accordingly, it will be seen that the side surface 72 of the body B will be protected against contact with the bed material as the body enters the gas box.

The body is lowered into the upper end of the gas box by sliding the tubular portion 50 of the carrier downwardly against the spring 56. After the proper length of time to ensure the formation of a coating on the surface or surfaces of the body which are not shielded, the tensioned spring will assist in restoring the coated body to the elevated position in which it is shown in FIG. 1. Thus it will be seen that the body in the required heated condition may be placed on the upper end of the carrier structure and readily lowered into the fluidized bed so as to have the exposed surfaces, that is, the surfaces exposed to contact with the fusible coating material, receive the desired coating while the surface or surfaces opposing the inner surface of the porous wall 30 will not be coated due to the action of the gas coming through the porous wall under pressure and spreading out over the covered surface 72 of the body so as to prevent any of the coating material coming into contact with that surface. Also, it may be desirable to mask that portion of the porous wall 30 that is above the surface of the fluidized bed. This can readily be done using means, not shown, similar to shield means 60.

The pulverulent coating material referred to may be any one of a number of heat-fusible materials commonly used in the fluidized bed coating process and other fusion processes, which bed of pulverulent materials is generally designated R.

The structure thus far described has been directed to a single air box or casing mounted within a container for the fluidized material.

FIGS. 5 and 6 illustrate a construction whereby a multiplicity of the air box units or a battery of such units may be installed in a single fluidizing container so that a number of bodies may be treated at one time. In these FIGS. 5 and 6 the numeral 110 designates a container of a size to receive several of the air housings or boxes here shown as 6 in number and each being designated 126.

The container 110 is shown as being of rectangular configuration but obviously it may be round if such a configuration is found feasible, or of any other design, and it comprises an upper chamber section 112, a lower chamber section 114 and the gas porous partition 116 interposed between the sections.

The lower chamber section provides the gas chamber 118 into which the desired gas is passed by the conduit 120 through the control valve 121.

The air casings or boxes into which the air or other suitable gas is conveyed from the supply line 120 through the feed pipe line 124, are of the same design as the casing or box 26 with the exception that the outer walls thereof are provided with coupling nipples whereby a number of the casings or boxes can be connected together so that the fluidizing air or gas, when introduced into one of the boxes from the line 124, may flow into each of the other boxes. These casings or boxes are each generally designated 126 and one thereof is provided with the nipple 172 for the connection of the line 124 therewith. The other casings are provided with two or more similar nipples, designated 172', which are threaded or otherwise formed to be operatively coupled together by couplings 173 when the series of casings are set up in the required order or arrangement, as shown in FIG. 5.

Since each of the hollow wall gas casings or boxes 126 is of the same construction as the box 26, as previously stated, it is not believed that a detailed description of each of these casings 126 is required.

Each of the gas casings or boxes 126 has positioned therein a shield 160. This shield is of the same construction and is supported in the same manner as the shield 60 and when in position within the casing lies snugly against the inner surface of the air or gas pervious inner wall 130. It is also maintained in position for ready vertical adjustment, in the same manner as shield 60.

FIGS. 7 and 8 illustrate a construction of apparatus for carrying out the method of the present invention for the coating of the exterior surface of a hollow body while masking the interior surface against the application of a coating thereon. Such hollow body which is generally designated B-2 may constitute a portion of a casing or a cover for a casing, and while it is here shown in plan as being generally rectangular in outline and having a rounded top surface, obviously it may take any form.

The container for the pulverulent thermoplastic material is designated in FIGS. 7 and 8 by the reference numeral 210 and comprises the upper and lower chamber-forming sections 212 and 214, respectively, and the gas pervious partitioning wall therebetween which is designated 216 and which provides the gas chamber 218 into which the gas under desired pressure is introduced by way of the pipe 220.

As shown in FIG. 7 the body carrier is designed to raise and lower the body out of and into the upper chamber-forming section 212 by means of a supporting tubular standard rising into the fluidizing chamber through the center of the porous partitioning wall 216 and the bottom of the lower chamber-forming section 214. This body carrier is generally designated 242 and the tubular body supporting member is designated 248 and passes upwardly through a suitable gas-tight packing 248a in the bottom of the lower chamber portion 214 and through an opening 248b in the center of the partitioning wall 216.

The tubular support or standard 248 is connected at its lower end and beneath the container 210 with suitable motor means, generally designated M, for effecting the vertical reciprocation of the body carrier 242. No details of the motor means are shown, since it is obvious that any suitable mechanism may be employed for this purpose, such as a compressed air actuated piston, not shown, supported for vertical reciprocation and operatively connected with the tubular standard 248.

The top end of the tubular standard carries within the upper chamber section 212 of the container, an air or gas casing or box which is generally designated 226. This casing comprises the solid nonpervious wall 228, corresponding to the nonpervious wall 28 hereinbefore referred to, and the air or gas pervious wall 230 which is joined to the wall 228 to form the air or gas receiving chamber 236.

The pervious wall 230 may be of the proper form or configuration to conform either closely or loosely to the inside area of the body which is to be masked.

The nonpervious or nonporous wall 228 is supported horizontally upon the top end of the tubular standard 248 and has an opening 228a communicating with the interior of the tubular standard to permit the air or gas to enter the chamber 236.

The gas is introduced into the tubular standard 248 by the flexible conduit 224, which has one end coupled with the supply pipe 220 while the other end is connected to an inlet nipple 272 leading into the lower end of the standard 248 as shown.

The interior surface of the body B-2 may rest directly upon the top surface of the porous or gas pervious wall 230 or it may be elevated very slightly from the surface of the wall 230 as illustrated.

Where the interior surface of the body B-2 may not have a high degree of smoothness, the gas under pressure will force its way out of the chamber 236 between the wall of the body and the wall 230 and escape from under the perimeter of the body and which perimeter may rest directly upon the surface of the wall 228 adjacent to the edge or periphery of the latter.

Means may also be provided to facilitate the escape of the gas across the edge or perimeter of the body being coated between such edge and the adjacent surface of the wall 228, by providing outwardly projecting fingers as indicated at 228b or the edge of the wall 228 may be suitably slotted or provided with several pins on which the body will rest.

Means is provided around the edge or periphery of the porous wall 230 for maintaining in position on or above the wall, metallic bodies which otherwise might be displaced during the up and down movement of the body support. Such holding means may comprise fixed permanent magnets 229 suitably located adjacent the inner surface of the body being coated or such holding means may be of the electro-magnetic type.

Means is also provided as a modification of the structure hereinbefore described, in the form of a hand tool for dipping small bodies into the fluidized bed and for air or gas masking an area or areas of the body to prevent the coating of such areas.

FIGS. 9 to 13, inclusive, illustrate the hand tool which has incorporated with it or in which a part thereof consists of differently shaped and interchangeably mounted masking elements.

The hand tool is in the form of a tongs which is generally designated 300 and which comprises the pair of longitudinally curved tubular arms 301 and 302 which are in crossed relation and pivotally connected together by the pivot pin 303. As shown in FIG. 9, the pivot is nearer to one end of the arms than the other so that there are provided the two shorter forwardly extending jaw ends a and the longer handle ends b. Also, it will be seen that the arms are arranged with the concave sides opposed so that the handle ends can be conveniently grasped for closing the tongs or for moving the jaw ends together or separating them as desired.

The jaw ends are threaded as indicated at 304, or otherwise suitably formed for facilitating the detachable connection therewith of the jaw elements about to be described.

The handle portions of the arms are provided at or adjacent to their free ends with means 305 for the connection to each arm of a flexible gas conducting tube or conduit 306.

By the provision of sleeves 307 in and extending transversely of the arms at the proper position to receive, when they are aligned, the pivot bolt 303, the loss of the fluidizing air or other gas at the joint between the arms is minimized.

FIGS. 9 to 11 illustrate the jaw elements detachably coupled to the jaw ends a of the arms for engaging around and masking an area of a cylindrical body generally designated B-3. The jaw elements when closed around the body, form an annular casing or box which is generally designated 308 and which presents on its inner side to the area of the body to be masked, a pervious or porous wall through which the air or other gas is discharged to form the mask, and a nonpervious wall connected to the pervious wall to form the gas receiving chamber.

Each of the sections or halves of the annular casing or gas box is designated 309 and comprises the inner circular wall portion 310 formed of the required porous material, the circular outer wall portion 311 and the connecting portions 312 between the same and the porous wall portion 310, which wall portions 311 and 312 are nonporous and form in conjunction with the wall 310, the semicircular air chamber or gas chamber 313.

Each of the walls 311 carries and has opening thereinto the tubular coupling nipple 314 which may be interiorly threaded to receive the threaded end 304 of an arm portion a. As will be seen upon reference to FIG. 9, the connections between the halves 309 of the gas casing or box and the jaw ends of the arms, is such that when the tongs are closed, the ends of the halves 309 will come together to form the complete annular casing. The adjacent or opposing ends of the halves 309 of the casing may be opened or closed as desired.

The inside diameter of the porous wall 310 of the annular casing is illustrated particularly in FIG. 11 as having a slight clearance or space 316 between it and the surface of the body B–3. This minute clearance space assures the ready escape of the masking gas, and in order to further assure such escape of the gas, the edges of the wall portion 312 which engage against the surface of the body B–3 may be grooved as indicated at 318. However, this provision of clearance between the body and the surface of the pervious wall 310, and the grooving of the edges of the wall portions 312, may not be required in all cases since, as previously stated, there may be enough or sufficient unevenness of the engaging surfaces of the parts to permit the gas to pass out from between the parts.

Gas casings or other configurations may be provided to encircle bodies of different contour as, for example, there is shown in FIG. 13 a gas casing or box generally designated 319 embodying the two angled halves 320 which, when their free ends are brought together in the manner shown, form a casing of square outline. The angled halves may be of different proportions also to form a rectangle or, in fact, to form a box of any desired shape, and one of the two angularly related parts of each half 320 carries the tubular coupling nipple 321 for connection with the jaw end of one of the arms of the tongs.

It will be understood, of course, that except for the form or configuration of the casing 319, the construction of each of the halves is the same as that shown and described in connection with the halves of the casing 308.

In the use of the manual means for introducing a body into a fluidizing bed, such as the means shown and described in connection with FIGS. 9 to 13, inclusive, the absorption of heat from the heated body by the handling means or by the body enclosing air casings 308 or 319 or cases of a similar construction and of different form, may be prevented or at least reduced to a considerable degree, by having a masking air of a low temperature and this obviously would prevent the manually operated body carriers from becoming coated with the coating material. If necessary, of course, the handling means can be cored for water cooling.

From the foregoing, it will be seen that there is provided by the present invention in the different embodiments illustrated and described, a new method and means for carrying out the same, for masking out areas of heated bodies which are to have portions thereof or other areas coated by the fluidized bed coating process. Such new method and mechanism for carrying out the same will enable an operator to mask and coat articles rapidly and with good results, and avoid the heretofore undesirable condition of having to discard the masking body after a few times of use due to the body itself absorbing heat from the heated body which is to be coated, and so having to be discarded. In the present method, the shielding means may be used repeatedly without becoming unusable for any reason whatsoever.

As this invention may be embodied in several forms without departing from the spirit or essential characteristics thereof, the present embodiment is therefore illustrative and not restrictive, since the scope of the invention is defined in the appended claims, and all changes that fall within the metes and bounds of the claims, or that form their functional as well as conjointly co-operative equivalents, are therefore intended to be embraced by those claims.

I claim:

1. In combination, in fluidized bed coating, an open top receptacle for containing a pulverulent coating material, means for discharging a gas upwardly in the receptacle to fluidize a pulverulent coating material therein, means forming a gas box having a gas pervious wall positioned for discharging a gas into a fluidized bed of coating material in the receptacle, means for introducing gas into said box for discharge through said wall, and means for supporting a heated body in the receptacle with a surface area of the body positioned in close proximity to an area of said wall while the pulverulent coating material is fluidized whereby said surface area of the body is masked by gas impinging thereon to prevent coating the masked area while another area of the body is in contact with and coated by the coating material.

2. The invention according to claim 1 wherein the said means for supporting a heated body in the receptacle is movable in the receptacle for lowering a body therein and for elevating it out of the receptacle after the completion of the coating operation.

3. In combination, in fluidized bed coating, an open top receptacle for containing a pulverulent coating material, means for discharging a gas upwardly in the receptacle to fluidize a pulverulent coating material therein, means forming an annular hollow walled gas box of a height and width to be positioned within the receptacle and partly submerged in a bed of pulverulent coating material therein wherein a gas rising under pressure in the receptacle through the pulverulent material will effect the fluidizing of the pulverulent material around and within said gas box, means for introducing gas under pressure into the gas box, said gas box having an inside wall of gas pervious material, the gas box having an open top and means for supporting and lowering into the gas box through the open top thereof, a heated body with a surface area thereof in close proximity to a prescribed area of the inner surface of said gas pervious wall whereby gas passing through the wall and impinging upon the adjacent surface of the heated body will mask such surface against contact with the coating material, while another surface of the heated body is exposed to contact with the coating material.

4. The invention according to claim 3 with means for shielding different size areas of the inner surface of the gas pervious wall for masking different sized areas of a body being coated.

5. The invention according to claim 3 wherein said body supporting means is spring supported to be raised by the spring support following lowering of the body into the pulverulent fluidizing coating material in the gas box.

6. In combination, in fluidized bed coating, an open top receptacle for containing a pulverulent coating material, means for discharging a gas upwardly in the receptacle to fluidize a bed of pulverulent coating material therein, means within the receptacle forming a body supporting a gas box, means for raising and lowering said gas box out of and into the receptacle for immersion in a bed of fluidized coating material, said box having a wall of gas pervious material, means for supporting a body on the box with an area of the body in close proximity to and in opposed relation with said porous wall whereby gas discharged through the porous wall will form a masking covering to maintain said area of the body against contact with the coating material, and means for introducing gas under pressure into said box.

7. The invention according to claim 6 wherein the said means for raising and lowering the gas box comprises a tubular standard extending upwardly through the bottom of the receptacle and supporting the gas box upon the top end thereof, power means connected with the standard for vertically reciprocating the same, and the said means for introducing gas under pressure into the box comprises an axial psasage in the standard opening into the box and means for connecting a gas conveying conduit to the lower end of the standard below the receptacle and leading into the said passage.

8. The invention according to claim 6 with magnetic means for maintaining a metallic body in position upon the gas box.

9. The invention according to claim 7 wherein the gas pervious wall of the box is directed upwardly in the receptacle and is of a contour to substantially conform to an interior surface of a hollow body, and there being means carried out by the box for maintaining a body in position over the porous wall during vertical movement of the box.

10. In fluidized bed coating wherein there is a container for a bed of pulverulent heat fusible material and a means for introducing a gas into the lower part of the bed, means for grasping a body for introduction in a heated condition into a fluidized bed of heat fusible coating material and for masking an area of the body which is to remain uncoated, said means comprising a tongs having a pair of crossed pivotally joined arms, said arms having two adjacent forward ends forming jaw ends and two rearwardly extending portions forming handle ends, said arms being tubular, a pair of jaws, each connected with a jaw end of an arm and adapted to be closed toward one another for gripping a body, said jaws being hollow and each being in communication with the supporting arm therefor, each of said jaws including a gas pervious wall portion and said wall portions being in opposed relation with one another to be directed toward a surface area of a body held between the jaws, and means for introducing gas into said hollow jaws through the tubular handles for discharge through the porous wall portions of the jaws for masking an area of a supported body against contact with coating material.

11. The invention according to claim 10 wherein said jaws are contoured to encircle a grasped body and the jaws being detachably connected with the arms whereby cooperating pairs of jaws of different contours may be attached to the arms.

12. A method for simultaneously masking selected portions of an article and supporting the article during heat fusion coating processes in which the article, while heated, is contacted with solid, finely divided, heat-fusible coating materials, which comprises:

heating the article to a temperature in excess of the fusion temperature of the coating materials;

supporting the article for movement into and out of contact with the coating materials by engaging the article, at the selected portions, with a gas-pervious surface;

discharging gas at superatmospheric pressure through the gas-pervious surface and impinging the gas against the selected portions of the article;

continuing the discharge and impingement of the gas to cause a continuous flow of gas between the gas-pervious surface and the selected portions of the article in order to prevent the coating materials from entering the space between the selected portions of the article and the gas-pervious surface; and contacting the heated article, while so supported and masked, with the heat-fusible coating materials and causing the solid, finely divided, heat-fusible materials to fuse onto the unmasked areas of the article.

References Cited

UNITED STATES PATENTS

| | | | |
|---|---|---|---|
| 2,953,483 | 9/1960 | Torok | 117—38 X |
| 3,074,808 | 1/1963 | Harrison | 117—18 |
| 3,138,483 | 6/1964 | Dettling et al. | 117—18 X |
| 3,142,579 | 7/1964 | Brooks | 117—18 |
| 3,185,131 | 5/1965 | Manning | 117—21 X |
| 3,218,184 | 11/1965 | Lemelson. | |
| 3,257,116 | 6/1966 | Sharetts et al. | 117—21 X |
| 3,261,707 | 7/1966 | Korski | 117—21 X |
| 848,557 | 3/1907 | Klaber | 117—98 X |
| 987,437 | 3/1911 | Daniels | 117—98 X |
| 2,740,725 | 4/1956 | Ball | 117—98 X |
| 3,264,720 | 8/1966 | Mott | 117—99 X |
| 883,172 | 3/1908 | Corbin | 118—425 X |
| 2,721,535 | 10/1955 | Zitkus | 118—301 |
| 3,099,583 | 7/1963 | McLean | 118—505 |
| 3,102,043 | 8/1963 | Winthrop et al. | 117—21 |
| 3,108,022 | 10/1963 | Church | 117—21 |
| 2,088,542 | 7/1937 | Westin | 118—301 X |
| 2,844,489 | 7/1958 | Gemmer | 117—21 X |
| 2,867,551 | 1/1959 | Kozak | 118—63 X |
| 2,946,696 | 7/1960 | Lopenski | 118—504 X |
| 2,987,413 | 6/1961 | Dettling et al. | 117—21 |
| 2,953,483 | 9/1960 | Torok | 117—38 X |
| 3,142,579 | 7/1964 | Brooks | 117—18 |

WILLIAM D. MARTIN, *Primary Examiner.*

PAUL F. ATTAGUILE, *Assistant Examiner.*

U.S. Cl. X.R.

117—18, 25, 38; 118—406, 425, 429, 504, 505